(12) United States Patent
Ko

(10) Patent No.: US 7,633,746 B2
(45) Date of Patent: Dec. 15, 2009

(54) DISPLAY DEVICE

(75) Inventor: Chun-Seok Ko, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 11/498,690

(22) Filed: Aug. 3, 2006

(65) Prior Publication Data
US 2007/0206127 A1 Sep. 6, 2007

(30) Foreign Application Priority Data
Feb. 23, 2006 (KR) .................. 10-2006-0017577

(51) Int. Cl.
*H05K 5/00* (2006.01)
(52) U.S. Cl. .................. 361/679.21; 349/58
(58) Field of Classification Search ............ 361/681, 361/679.21; 349/58
See application file for complete search history.

(56) References Cited
U.S. PATENT DOCUMENTS

| | | | |
|---|---|---|---|
| 4,468,659 A | 8/1984 | Ohba et al. | 340/719 |
| 6,462,803 B2 * | 10/2002 | Kumagai et al. | 349/153 |
| 6,784,951 B2 * | 8/2004 | Kuroki et al. | 349/58 |
| 7,257,306 B2 * | 8/2007 | Sakurai et al. | 385/147 |
| 7,285,918 B2 * | 10/2007 | Chang | 315/169.3 |
| 2001/0048492 A1 * | 12/2001 | Natsuyama | 349/58 |
| 2004/0156168 A1 * | 8/2004 | LeVasseur et al. | 361/681 |
| 2006/0002064 A1 * | 1/2006 | Oooka et al. | 361/681 |

FOREIGN PATENT DOCUMENTS

| | | |
|---|---|---|
| JP | 2-101495 | 8/1990 |
| JP | 8-146897 | 6/1996 |
| KR | 2003-0028152 | 4/2003 |

* cited by examiner

*Primary Examiner*—Jayprakash N Gandhi
*Assistant Examiner*—Ingrid Wright
(74) *Attorney, Agent, or Firm*—Cantor Colburn LLP

(57) ABSTRACT

A display device including supporting members suitable for supporting an organic luminescent display panel is provided. The display device includes a panel assembly displaying images, a first supporting member supporting the panel assembly and contacting a front surface of the panel assembly, and a second supporting member interconnected with the first supporting member, supporting the panel assembly and contacting a rear surface of the panel assembly, wherein the panel assembly is an organic luminescent display panel.

14 Claims, 4 Drawing Sheets

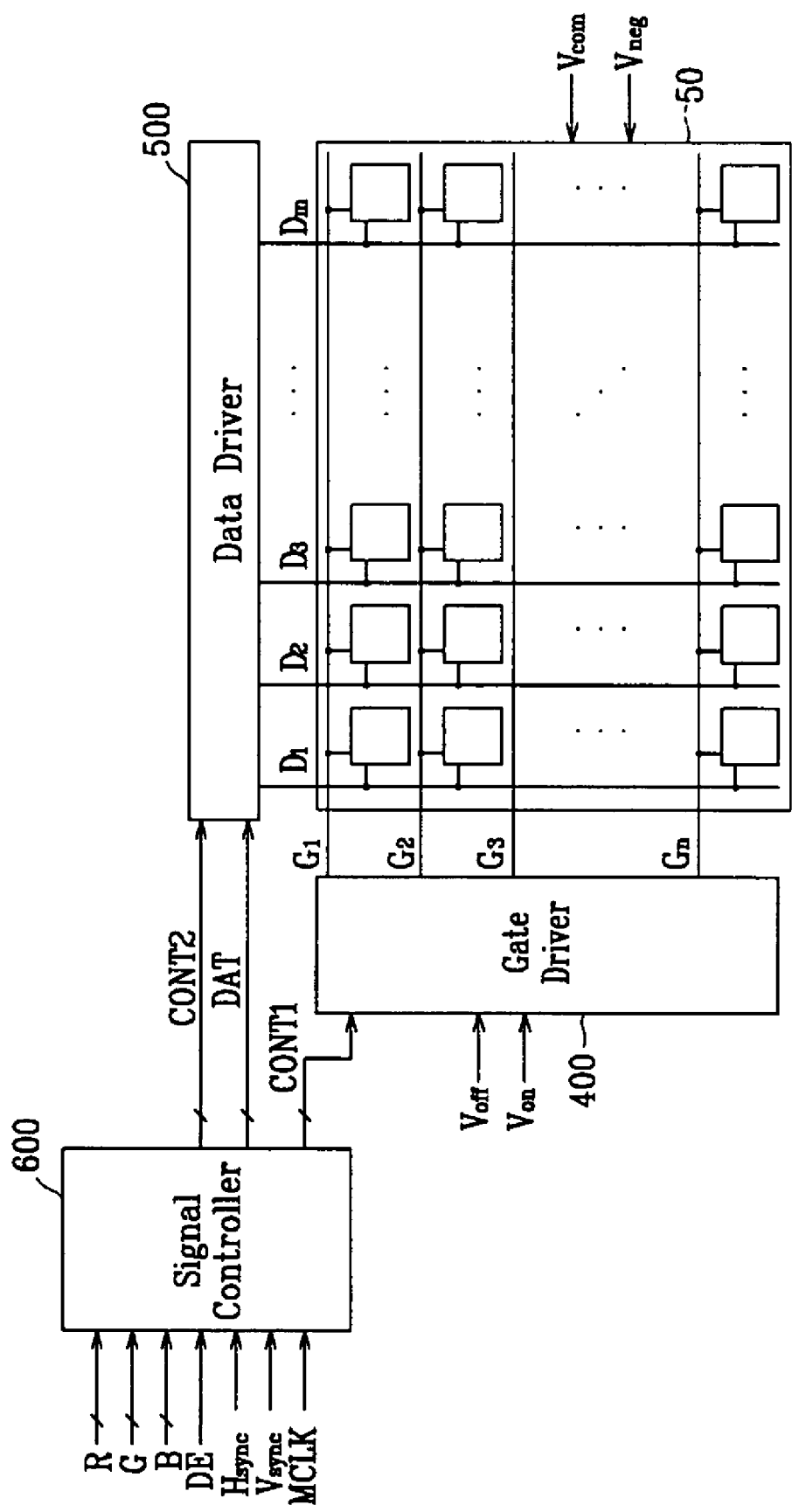

DISPLAY DEVICE

This Application claims priority to Korean patent application number 10-2006-0017577 filed on Feb. 23, 2006, and all the benefits accruing therefrom under 35 U.S.C. §119, the contents of which are incorporated by reference herein in its entirety.

BACKGROUND OF THE INVENTION (a) Field of the Invention

The present invention relates to a display device, and more particularly, to a display device including supporting members suitable for supporting an organic luminescent display panel.

(b) Description of the Related Art

Recently, a flat panel display device that overcomes the shortcomings of conventional cathode ray tubes (CRT) and can be made in a thin and compact size has been spotlighted as a future display device. In such a flat panel display device, display panels such as a liquid crystal display panel and an organic luminescent display panel are used.

The organic luminescent display panel is a self-emission type of display panel that displays images by exciting organic compounds, and the display device using the organic luminescent display panel does not require a separate light supplier such as a backlight assembly which is necessary when used with a liquid crystal display panel.

The display device using the liquid crystal display panel accommodates the backlight assembly therein, so the supporting structure thereof is relatively complicated. On the other hand, the display device using the organic luminescent display panel can employ a relatively simple supporting structure.

As a result, there is a demand for developing a thinner and more compact display device having an organic luminescent display panel and a simplified structure for supporting the organic luminescent display panel.

BRIEF SUMMARY OF THE INVENTION

An exemplary embodiment provides a thinner and more compact display device having a simplified supporting structure.

An exemplary embodiment provides a display device including a panel assembly displaying images, a first supporting member supporting the panel assembly and contacting a front surface of the panel assembly, and a second supporting member interconnected with the first supporting member, supporting the panel assembly and contacting a rear surface of the panel assembly. The panel assembly may comprise an organic luminescent display panel.

In an exemplary embodiment, the first supporting member includes a front surface section including a display window exposing a portion of the front surface of the panel assembly, the front surface section contacting the front surface of the panel assembly, and an outer sidewall section bent from the front surface section in a vertical direction. The second supporting member includes a rear surface section contacting the rear surface of the panel assembly and an inner sidewall section bent from the rear surface section in a vertical direction, the inner sidewall section being interconnected with the outer sidewall section of the first supporting member.

In an exemplary embodiment, each of the first supporting member and the second supporting member may comprise a metallic material.

In an exemplary embodiment, the display device may further include a bonding member disposed between the rear surface section of the second supporting member and the rear surface of the panel assembly, the bonding member fixedly attaching the panel assembly to the second supporting member.

In an exemplary embodiment, the display device may further include a third supporting member disposed between the first supporting member and the second supporting member, the third supporting member fixedly supporting a lateral surface of the panel assembly, and the third supporting member comprise a resin material.

In an exemplary embodiment, the first supporting member may comprise a metallic material and the second supporting member may comprise from a resin material.

In an exemplary embodiment, the second supporting member may support portions of the lateral surface and the rear surface of the panel assembly.

In an exemplary embodiment, the second supporting member includes supporting parts exposing a portion of the rear surface of the panel assembly. The supporting parts may be disposed in longitudinal and transverse directions of the second supporting member.

In an exemplary embodiment, the display device may further include a printed circuit board provided on the rear surface section of the second supporting member, the printed circuit board supplying a drive signal to the panel assembly.

In an exemplary embodiment, the display device may further include a first flexible printed circuit film provided between the outer sidewall section of the first supporting member and the inner sidewall section of the second supporting member, the flexible printed circuit connecting the printed circuit board to one side of the panel assembly.

In an exemplary embodiment, the inner sidewall section of the second supporting member adjacent to the flexible printed circuit film may include a cutout section formed by cutting out a portion of the inner sidewall section. A sidewall portion of the third supporting member adjacent to the flexible printed circuit film may also include a cutout section accommodating the flexible printed circuit film.

In an exemplary embodiment, the first flexible printed circuit film may include a first integrated drive circuit chip mounted on the first flexible printed circuit.

In an exemplary embodiment, the display device may include an second flexible printed circuit film having an integrated drive circuit chip mounted on the second flexible printed circuit and attached to another side of the panel assembly adjacent to the one side of the panel assembly.

In an exemplary embodiment, a display device includes a panel assembly displaying images, a first supporting member supporting the panel assembly and contacting a front surface of the panel assembly, a second supporting member interconnected with the first supporting member, the second supporting member supporting the panel assembly and contacting a rear surface of the panel assembly and a third supporting member disposed between the first supporting member and the second supporting member and contacting sides of the panel assembly. The panel assembly comprises an organic luminescent display panel.

In an exemplary embodiment a display device includes a panel assembly displaying images, a first supporting member supporting and contacting a front surface of the panel assembly and a second supporting member interconnected with the first supporting member. The second supporting member supports a lateral surface and a rear surface of the panel assembly and contacts portions of the lateral surface and portions of the rear surface of the panel assembly. The panel assembly comprises an organic luminescent display panel.

In an exemplary embodiment, it is possible to provide a thinner and more compact display device.

BRIEF DESCRIPTION OF THE DRAWINGS

The above and other features and advantages of the present invention will become more apparent by describing in detail exemplary embodiments thereof with reference to the attached drawings, in which:

FIG. 4 is a block diagram showing an exemplary embodiment of a construction of a panel assembly included in a display device according to the present invention.

DETAILED DESCRIPTION OF THE INVENTION

Figure 1:
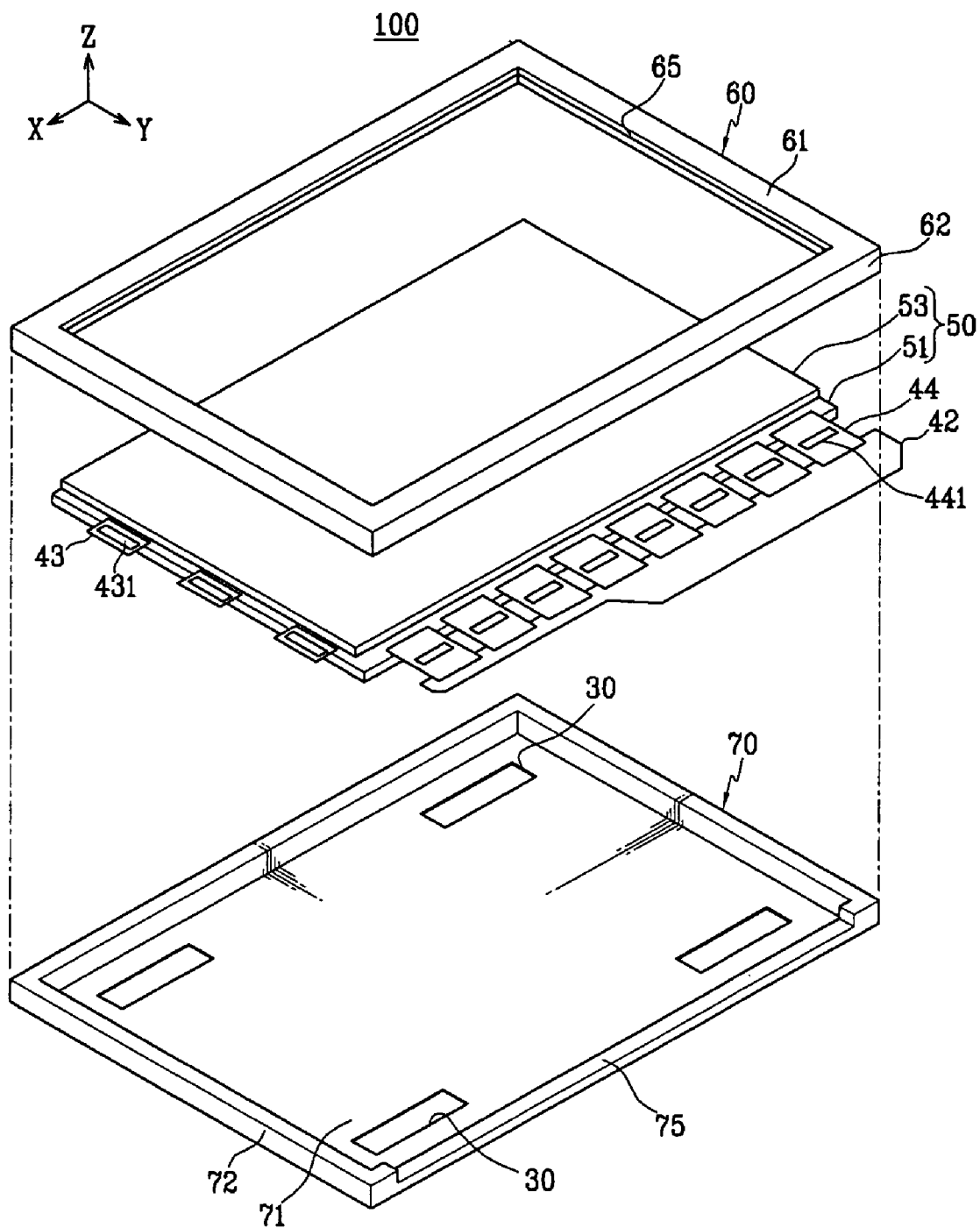
FIG. 1 is an exploded perspective view showing an exemplary embodiment of a display device according to the present invention.

Now, the display device according to the embodiments of the present invention will be described with reference to the attached drawings. The embodiments of the present invention are exemplary ones, and the present invention is not limited thereto. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "relative to" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Also, in various embodiments, elements having the same construction will be representatively explained in one exemplary embodiment by using the same reference numbers, and, in the other exemplary embodiments, different elements from the one exemplary embodiment will be explained.

For clarity, parts not related with the illustration will be omitted, and the same reference number will be denoted to the same or similar element throughout the specification.

FIG. 1 illustrates an exemplary embodiment of a display device 100 according to the present invention.

As depicted in FIG. 1, the display device 100 includes a panel assembly 50 displaying images, a first support member 60 supporting the panel assembly 50 and contacting with a front surface of the panel assembly 50, and a second supporting member 70 supporting the panel assembly 50 and contacting with a rear surface of the panel assembly 50.

The display device 100 further includes a printed circuit board (PCB) 42 supplying a drive signal to the panel assembly 50, a first flexible printed circuit (FPC) film 44 electrically connecting the printed circuit board 42 to one side of the panel assembly 50, and a second flexible printed circuit film 43 attached to the other side of the panel assembly 50, the other side adjoining the one side of the panel assembly 50 connected to the first flexible printed circuit film 44. On the first flexible printed circuit film 44 and the second flexible printed circuit film 43, respectively, integrated drive circuit chips 441 and 431 are mounted. In exemplary embodiments, the first and/or second flexible printed circuit films 44 and 43 may be packed into a chip on film package (COF) or a tape carrier package (TCP).

In the illustrated exemplary embodiment, the panel assembly 50 is a self-emission type of organic luminescent display panel, and includes a first (or lower) panel 51 having a plurality of thin film transistors (not shown) and an organic emitting layer (not shown) formed thereon, and a second (or upper) panel 53 covering the first panel 51. The thin film transistor and the organic emitting layer constitute a pixel, which is a minimal unit for displaying images.

In exemplary embodiments, such as that illustrated in FIG. 1, the display device may be substantially frame shaped. For orientation purposes, a Cartesian coordinate system may be used where a first side of the display device extends along a Y-axis direction and a second side of the display device extends along an X-axis direction, where the Y-axis is substantially perpendicular to the X-axis and a Z-axis (or vertical) direction is substantially perpendicular to both the X and Y axes.

The first supporting member 60 includes a front surface section 61 that lies in contact with the front surface of the panel assembly 50, a display window 65 exposing a portion of the front surface of the panel assembly 50, and an outer sidewall section 62 bent from the front surface section 61 in a substantially vertical direction. The outer sidewall section 62 extends from outer edges of the front surface section 61 toward the panel assembly 50 and the second supporting member 70.

The second supporting member 70 includes a rear surface section 71 contacts the rear surface of the panel assembly 50 and an inner sidewall section 72 bent from the rear surface section 71 in a substantially vertical direction. The inner sidewall section 72 extends from outer edges of the rear surface section 71 toward the panel assembly 50 and the first supporting member 60.

In forming the display device 100, the inner sidewall section 72 is interconnected or combined with the outer sidewall section 62 of the first supporting member 60. The inner sidewall section 72 is located inside the outer sidewall section 62. The outer sidewall section 62 may be considered as surrounding the inner sidewall section 72 when the two sections are combined.

The second supporting member 70 further includes a plurality of bonding members 30 provided between the rear surface section 71 of the second supporting member 70 and the rear surface of the panel assembly 50. The bonding members 30 fixedly attach the panel assembly 50 to the second supporting member 70.

The bonding members 30 may include any of a number of materials or elements such that the panel assembly 50 may be securely attached to the second supporting member 70 and not cause an overall thickness of the display device 100 to increase. In exemplary embodiments, the bonding members 30 may include adhesive compatible with the panel assembly 50, spaces or openings accommodating corresponding elements, such as protrusions, on a rear surface of the panel assembly, and/or other features connecting the panel assembly 50 with the second supporting member 70.

In exemplary embodiments, the first supporting member 60 and/or the second supporting member 70 may be formed of a chassis made of a metallic material.

The first flexible printed circuit film 44 may be bent to be positioned along a side of the inner sidewall section 72 of the second supporting member 70. When the flexible printed circuit film 44 is bent, the flexible printed circuit board 42 is located on an outer surface of the rear surface section 71 of the second supporting member 70 and a portion of the first flexible printed circuit film 44 is located between the outer sidewall section 62 of the first supporting member 60 and the inner sidewall section 72 of the second supporting member 70.

The inner sidewall section 72 of the second supporting member 70 corresponding to the first flexible printed circuit film 44 includes a cutout section 75. The cutout section 75 may be formed by cutting out or removing a portion of the inner sidewall section 72. The cutout section 75 is provided to accommodate the bent first flexible printed circuit film 44 and arrange the first flexible printed circuit film 44 in the display device 100 with ease.

In the illustrated exemplary embodiment, it is possible to fixedly support the panel assembly 50 and the printed circuit board 42 for driving the panel assembly 50, the flexible printed circuit films 43 and 44, and the like in a simple manner. Advantageously, it is possible to make a thinner and more compact display device.

Hereinafter, an exemplary embodiment of the display device 200 according to the present invention will be described with reference to FIG. 2.

Figure 2:
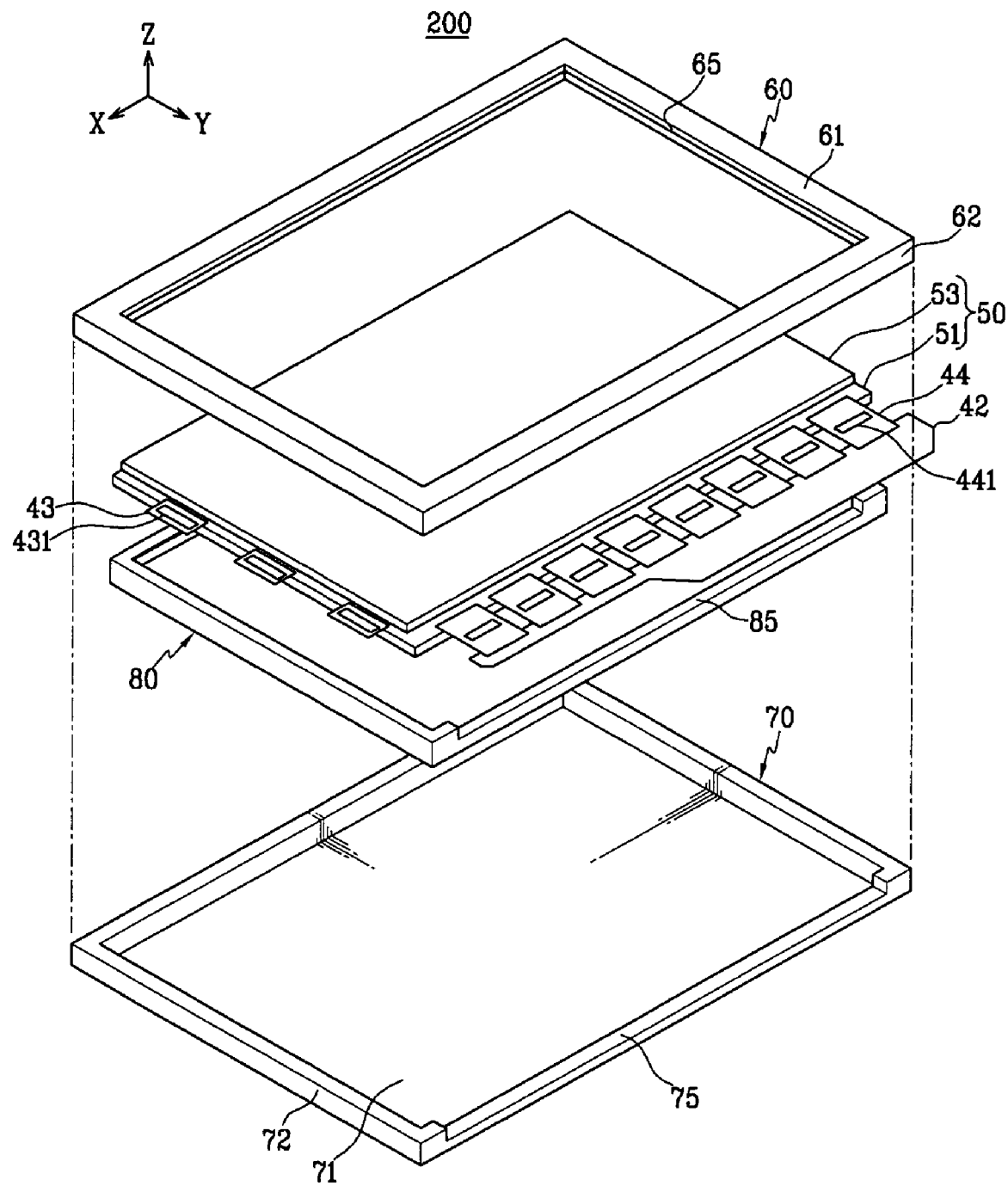
FIG. 2 is an exploded perspective view showing another exemplary embodiment of a display device according to the present invention.

As depicted in FIG. 2, the display device 200 includes a panel assembly 50 displaying images, a first support member 60 supporting the panel assembly 50 and contacting with a front surface the panel assembly 50, a second supporting member 70 supporting the panel assembly 50 and contacting with a rear surface of the panel assembly 50, and a third supporting member 80 sandwiched between the first supporting member 60 and the second supporting member 70 together with the panel assembly 50 such that a lateral surface (or side) of the panel assembly 50 is fixedly supported by the third supporting member 80.

In exemplary embodiments, the first supporting member 60 and the second supporting member 70 may be formed of a chassis made from a metallic material. In exemplary embodiments, the third supporting member 80 may be formed of a molded frame made from a resin material such as plastic.

The third supporting member 80 contacts the lateral surface of the panel assembly 50 and securely fixes the panel assembly 50 such that the panel assembly 50 may not fluctuate between the first supporting member 60 and the second supporting member 70. In the illustrated exemplary embodiment of display device 200 according to the present invention, it is possible to eliminate a bonding member 30 for attaching the panel assembly 50 to the second supporting member 70.

The second supporting member 70 and the third supporting member 80 include cutout sections 75 and 85, respectively, corresponding to the first flexible printed circuit film 44. The cutout sections 75 and 85 may be formed by cutting out or removing portions of the sidewalls of the second supporting member 70 and the third supporting member 80 adjacent to the first flexible printed circuit film 44. Advantageously, the first flexible printed circuit film 44 can be easily arranged and connect the panel assembly 50 and the printed circuit board 42 in a stable manner.

In the illustrated exemplary embodiment, it is possible to fixedly support the panel assembly 50, the printed circuit board 42 for driving the panel assembly 50, the flexible printed circuit films 43 and 44, and the like in a simple manner. Advantageously, it is possible to make the display device in a thinner and more compact size.

In addition, it is possible to support the panel assembly 50 in a more stable manner.

Hereinafter, an exemplary embodiment of the display device 300 according to the present invention will be described with reference to FIG. 3.

Figure 3:
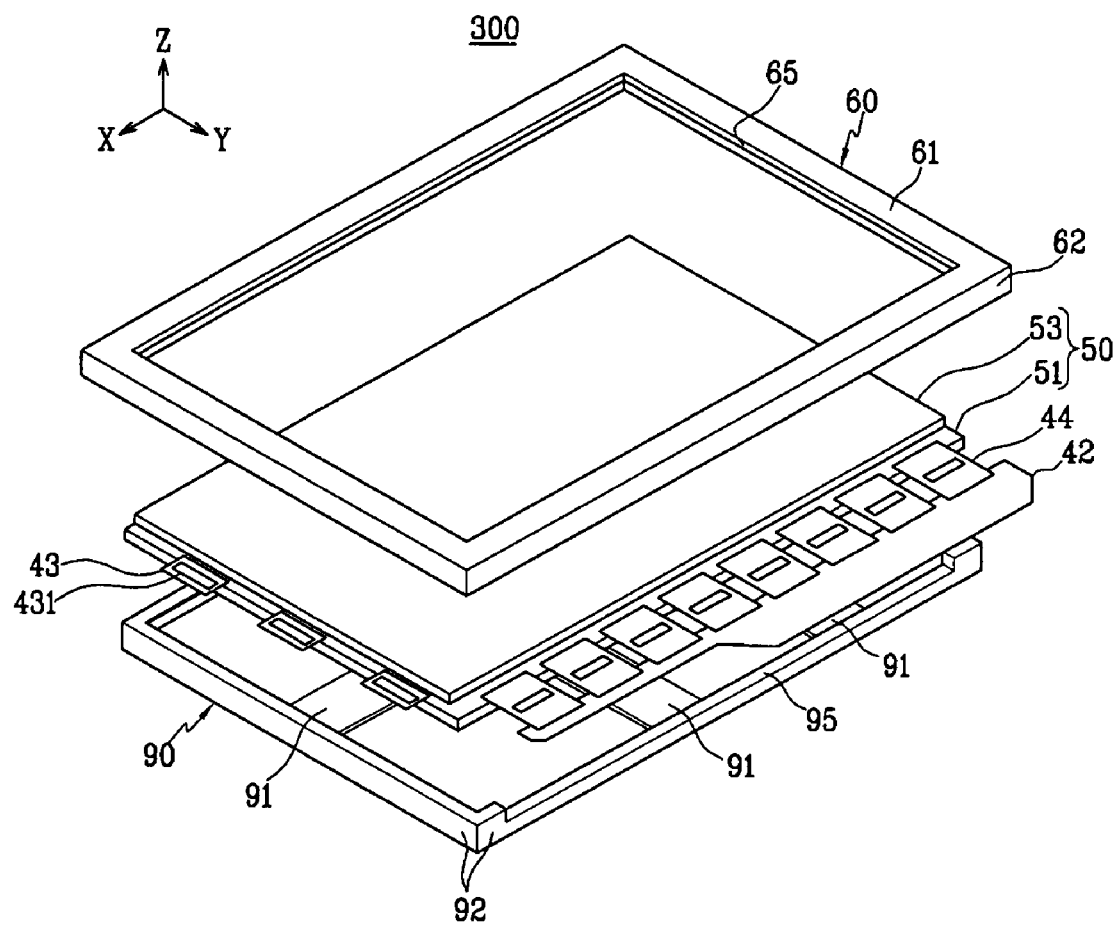
FIG. 3 is an exploded perspective view showing another exemplary embodiment of a display device according to the present invention.

As depicted in FIG. 3, the display device 300 includes a panel assembly 50 displaying images, a first support member 60 supporting the panel assembly 50 and contacting with a front surface the panel assembly 50, and a second supporting member 90 for supporting a lateral surface (or side) and a rear surface of the panel assembly 50 and contacting with an entirety or portions of the lateral and/or the rear surface of the panel assembly 50.

In exemplary embodiments, the first supporting member 60 may be formed of a chassis made from a metallic material, and the second supporting member 90 may be formed of a molded frame made from a resin material such as plastic.

With the second supporting member 90 formed of a molded frame being united with the first supporting member 60 while the second supporting member 90 stably supports the lateral surface and the rear surface of the panel assembly 50, the panel assembly 50 can ultimately be stably supported by a simpler arrangement. A special or additional fixation means such as a bonding member is no longer necessary, and it is possible to stably support the panel assembly 50 by means of only two supporting members 60 and 90.

The second supporting member 90 includes supporting parts 91 and an inner sidewall section 92. The supporting parts 91 disposed within the inner sidewall section 92. The supporting parts 91 are located at a predetermined distance (in a Z-axis direction) from a top surface of the second supporting member 90 to accommodate and securely fix the panel assembly 50 in the display device 300 when the first and second supporting members 60 and 90 are combined.

The supporting parts 91 are illustrated as substantially planar rectilinear elements, but the supporting parts 91 may be any of a number of shapes or cross-sectional profiles suitable for accommodating and fixing the panel assembly 50 in the display device 300 when the first and second supporting members 60 and 90 are combined.

The supporting parts 91 in the illustrated exemplary embodiment are shown arranged such that the supporting parts 91 extend substantially in a longitudinal direction (X-axis direction) and in a transverse direction (Y-axis direction), essentially crossing each other in a space defined by the inner sidewall section 92 of the second supporting member 90. One supporting part 91 is shown extended in the longitudinal direction and two supporting parts 91 are shown extended in the transverse direction, forming a matrix-type arrangement. However, any of a number of supporting parts 91 may be employed as is suitable for supporting and securing the panel assembly 50 in the display device 300. In alternative exemplary embodiments, the supporting parts 91 may also be arranged in other directions relative to the inner sidewall section 92 of the second supporting member 90, such as diagonally.

In exemplary embodiments, the supporting parts 91 essentially form a supporting surface (area) of the second supporting member 90 for the panel assembly 50. The supporting parts 91 may be arranged at any of a number of heights (in the Z-axis direction) along the inner sidewall section 92 of the second supporting member 90 and in any of a number of directions or quantities so as to provide an area suitable for stable support of the panel assembly 50 within the display device 300.

The arrangement of the supporting parts 91 in the second supporting member 90 provide that open areas exist between the supporting parts 91. These open areas expose a portion of the panel assembly 50. Since the second supporting member 90 of the illustrated exemplary embodiment exposes a portion of the rear surface of the panel assembly 50, it is possible to improve heat radiation efficiency of the display device.

The inner sidewall section 92 of the second supporting member 90 corresponding to the first flexible printed circuit film 44 includes a cutout section 95. The cutout section 95 may be formed by cutting out or removing a portion of the inner sidewall section 92. The cutout section 95 is provided to accommodate the bent first flexible printed circuit film 44 and arrange the first flexible printed circuit film 44 in the display device 300 with ease.

Hereinafter, an exemplary embodiment of a display device including the panel assembly 50 and the arrangement for driving the panel assembly 50 according to the present invention will be described in detail with reference to FIG. 4.

In the exemplary embodiment illustrated in FIG. 4, the display uses an organic luminescent panel assembly. The display includes a panel assembly 50, a scan driver 400, and a data driver 500 connected to the panel assembly 50, and a signal controller 600 controlling the scan driver 400 and the data driver 500. The signal controller 600 may be formed on the printed circuit board 42. The scan driver 400 and the data driver 500 may be respectively formed on the integrated drive circuit chips 431 and 441 mounted on the flexible printed circuit films 43 and 44.

As seen in the equivalent circuit diagram of FIG. 4, the panel assembly 50 includes a plurality of signal lines $G_1$ to $G_n$ and $D_1$ to $D_m$, and a plurality of pixels connected to the signal lines and arrayed substantially in a matrix.

The signal lines include a plurality of scan signal lines $G_1$ to $G_n$ transmitting scan signals $Vg_1$ to $Vg_n$, and data lines $D_1$ to $D_m$ transmitting data signals Vd. The scan signal lines $G_1$ to $G_n$ extend substantially in the row direction and are substantially parallel to each other, and the data lines $D_1$ to $D_m$ extend substantially in the column direction and are substantially parallel to each other.

Each of the plurality of pixels includes a light-emitting unit (not shown) to display images by emitting light and a circuit (not shown) driving the light-emitting unit.

The light-emitting unit has the characteristics of a diode, and may also called an organic light emitting diode (OLED). The light-emitting unit is structured to include a positive (+) electrode serving as a hole injection electrode (anode), a negative (−) electrode serving as an electron injection electrode (cathode), and an organic emitting layer disposed between these electrodes. The light-emitting unit emits light when an exciton generated from the combination of the holes and the electrons injected into the organic emitting layer from the respective electrodes transitions its state from the excited state to the ground state.

The organic emitting layer may be made of small molecular organic materials or polymeric organic materials. The organic emitting layer may have a single-layer structure that includes a single emitting layer, or a multi-layer structure that includes a light-emitting layer and one or more additional layer(s) around the light emitting layer. The additional layer may be selected from a hole injection layer (HIL), a hole transporting layer (HTL), a hole blocking layer (HBL), an electron transporting layer (ETL), an electron injection layer (EIL), and an electron blocking layer (EBL).

The circuit driving the light-emitting unit may include two or more thin film transistors and/or one or more capacitors.

One of the thin film transistors included in the circuit serves as a switch for selecting the light-emitting unit for the pixel that is to be lighted among the plurality of the pixels. The other thin film transistor serves as a driver that applies a driving power for lighting the light-emitting layer of the selected light emitting unit.

With this arrangement, pixels that need to be lighted are selected and desired images are displayed.

As in the illustrated exemplary embodiments described above, it is possible to make a thinner and more compact display device through a simplified supporting structure.

In an exemplary embodiment, it is possible to fixedly support a panel assembly, a printed circuit board, a flexible printed circuit film, and the like in a simple manner.

In an exemplary embodiment, it is possible to support the panel assembly in a more stable manner and improve heat irradiation efficiency.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A display device comprising:
   a panel assembly displaying images;
   a first supporting member supporting the panel assembly and contacting a front surface of the panel assembly;
   a second supporting member interconnected with the first supporting member and supporting the panel assembly, the second supporting member comprising a rear surface section directly contacting a rear surface of the panel assembly, and
   a third supporting member disposed between the first supporting member and the second supporting member, and contacting sides of the panel assembly, the third supporting member being a single continuous member;
   wherein the panel assembly comprises an organic luminescent display panel.

2. The display device of claim 1, wherein
   the first supporting member comprises a front surface section including a display window exposing a portion of the front surface of the panel assembly, the front surface section contacting the front surface of the panel assembly, and an outer sidewall section bent from the front surface section in a vertical direction, and
   the second supporting member comprises an inner sidewall section bent from the rear surface section in a vertical direction, the inner sidewall section being interconnected with the outer sidewall section of the first supporting member.

3. The display device of claim 2, wherein each of the first supporting member and the second supporting member comprises a metallic material.

4. The display device of claim 3,
   wherein the third supporting member comprises a resin material.

5. The display device of claim 4, further comprising a flexible printed circuit film provided between the outer sidewall section of the first supporting member and the inner sidewall section of the second supporting member, wherein the inner sidewall section and a sidewall portion of the third supporting member adjacent to the flexible printed circuit film includes a cutout section accommodating the flexible printed circuit film.

6. The display device of claim 2, wherein the first supporting member comprises a metallic material and the second supporting member comprises a resin material.

7. The display device of claim 6, wherein the second supporting member supports portions of a lateral surface and the rear surface of the panel assembly.

8. The display device of claim 7, wherein the second supporting member further comprises supporting parts exposing a portion of the rear surface of the panel assembly.

9. The display device of claim 8, wherein the supporting parts are disposed in longitudinal and transverse directions of the second supporting member.

10. The display device of claim 2, further comprising a printed circuit board provided on the rear surface section of the second supporting member, the printed circuit board supplying a drive signal to the panel assembly.

11. The display device of claim 10, further comprising a first flexible printed circuit film provided between the outer sidewall section of the first supporting member and the inner sidewall section of the second supporting member, the flexible printed circuit connecting the printed circuit board to one side of the panel assembly.

12. The display device of claim 11, wherein the inner sidewall section of the second supporting member adjacent to the flexible printed circuit film comprises a cutout section.

13. The display device of claim 11, wherein the first flexible printed circuit film comprises a first integrated drive circuit chip mounted on the first flexible printed circuit film.

14. The display device of claim 11, further comprising a second flexible printed circuit film including a second integrated drive circuit chip mounted on the second flexible printed circuit film and attached to another side of the panel assembly adjacent to the one side of the panel assembly.

* * * * *